United States Patent [19]

Jones

[11] 4,101,158
[45] Jul. 18, 1978

[54] CONVERTIBLE TRAILER FOR HAULING GRAIN AND A HARVESTING MACHINE

[76] Inventor: James Thomas Jones, Rte. 5, Box 114, Waco, Tex. 76705

[21] Appl. No.: 722,516

[22] Filed: Sep. 13, 1976

[51] Int. Cl.² .............................................. B60P 3/42
[52] U.S. Cl. ...................................... 296/10; 105/363; 280/783; 280/656
[58] Field of Search .................. 280/106 T, 656, 140, 280/143; 296/15, 6, 7, 11, 12, 13, 14, 10; 105/247, 363

[56] References Cited

U.S. PATENT DOCUMENTS

| | | | |
|---|---|---|---|
| 1,268,555 | 6/1918 | Epstein | 105/363 |
| 2,768,021 | 10/1956 | Kaster | 296/10 |
| 3,087,759 | 4/1963 | Worster | 296/10 |
| 4,015,858 | 4/1977 | Love | 280/106 T |

*Primary Examiner*—Joseph F. Peters, Jr.
*Assistant Examiner*—John A. Carroll
*Attorney, Agent, or Firm*—Wofford, Felsman, Fails & Zobal

[57] ABSTRACT

The trailer converts from a hopper for hauling grain to an overwidth flatbed with tracks for carrying a harvesting machine. The side and front panels of the hopper fold to a horizontal position from the erected position. The rear panel of the hopper is removable and stores on the folded front panel. A base track extends along each side of the trailer frame. An extensible track is hinged to the base track and folds in a vertical plane from a storage position on top of the base track to an extended position laterally outward of the base track, to increase the trailer width for hauling harvesting machines with wide wheel width. Transverse tapered box beams support the base track and extensible track. A second extensible track has beams that slide into the transverse box beams of the first extensible track for further widening.

13 Claims, 10 Drawing Figures

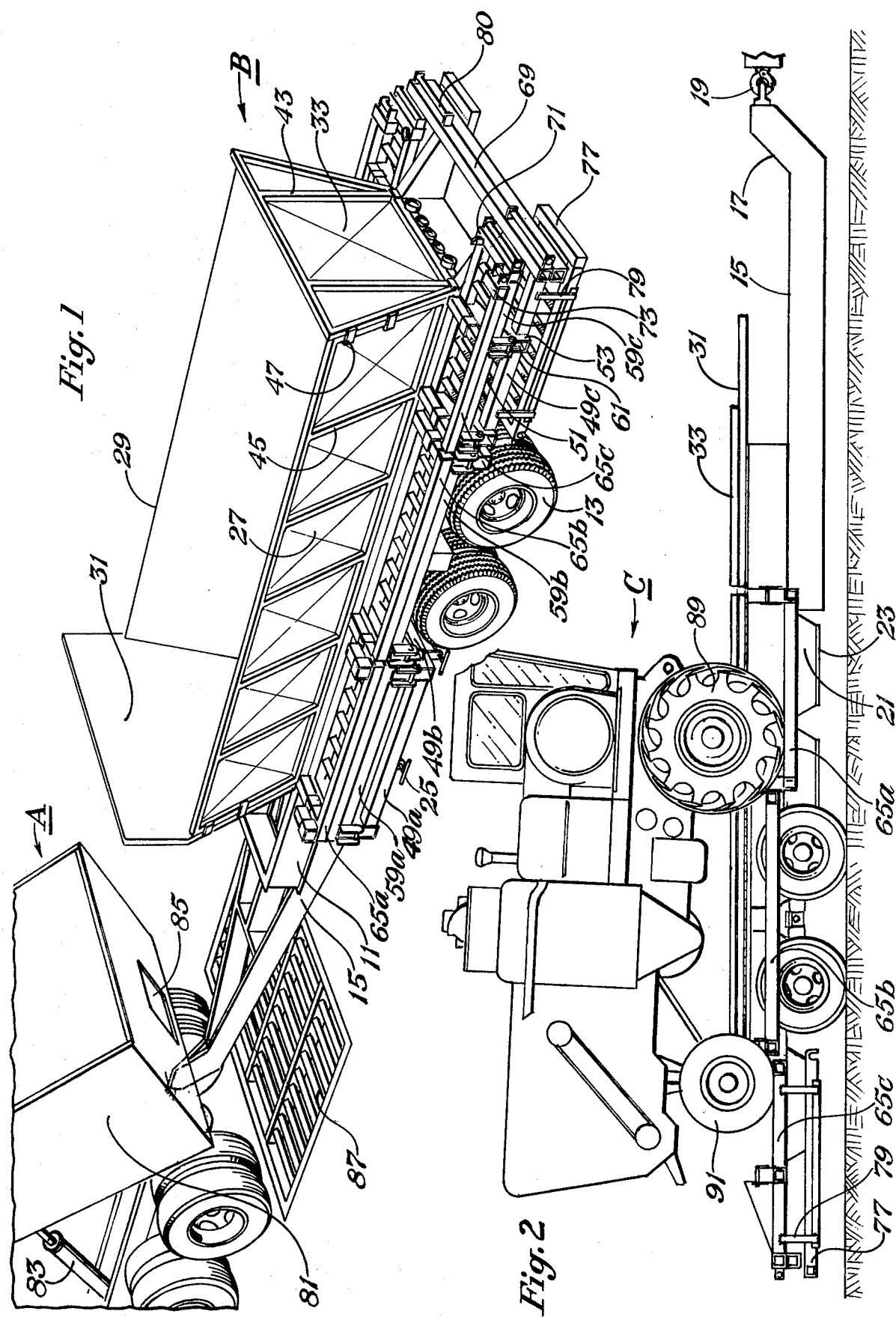

CONVERTIBLE TRAILER FOR HAULING GRAIN AND A HARVESTING MACHINE

BACKGROUND OF THE INVENTION

1. Field of the Invention

This invention relates in general to truck trailers and in particular to a trailer convertible from a hopper for hauling grain to an overwidth flat bed for hauling a harvesting machine.

2. Description of the Prior Art

A large amount of grain and other crops that are harvested by machine are harvested by independent contractors. These crews furnish the harvesting equipment and trucks for hauling the harvested grain from the fields to a storage elevator in the nearest town, or other suitable storage places. The harvesting machines normally called combines, are large self-propelled vehicles. Combines travel at a relatively slow speed and are not adapted for highway traffic, thus are normally hauled from one area to the other, if the distance is more than a few miles.

Many combines have an overall wheel width that may be as wide as 12½ feet from outer side to outer side of the wheels or tires. The headers or cutting assemblies may be 26 feet wide or greater. The header is usually removed for hauling, and carried on the bed of a grain hauling truck. However, even though the header is removed, the combine remains overwidth. Any width greater then legal width, which is now 8 feet for highway traffic, is used herein to mean "overwidth". Special permits and regulations are required for overwidth vehicles to be transported on highways.

Normally these overwidth combines are hauled on specially constructed trailers towed by conventional legal width grain hauling trucks. Some of these trailers are of variable width from legal width to 12 feet. On the variable width type, outriggers along the sides telescope in transverse pipes. Overwidth combines are carried by the extended outriggers. Other trailers are of fixed overwidth.

It would be desirable to increase the grain hauling capacity of the trucks without increasing truck size. The combine trailers known serve only to carry combines and are not capable of carrying grain, since they lack a hopper and dumping means. The fixed overwidth trailers are unsuitable for grain hauling, even if they contained the necessary structure, because of the special permits and regulations required for transporting overwidth vehicles on highways.

SUMMARY OF THE INVENTION

It is accordingly a general object of this invention to provide an improved trailer that is capable of hauling granular material in bulk at legal width and is convertible for hauling a vehicle with an overwidth wheel spacing.

It is a further object of this invention to provide an improved combine hauling trailer that is capable of hauling grain at legal width and is quickly convertible for hauling a combine with overwidth wheel spacing.

In accordance with these objects, a trailer is provided that has side, front, and end panels that may be disposed to define selectively a hopper and a flat bed. Preferably the sides and front panel are hinged to fold flat with the trailer. The end panel is detachable. Base and extensible tracks extend along the sides of the trailer. The outer edge of the base track is aligned with the outer side of the wheel, which is substantially legal width. The extensible track rests on the base track in a storage position and folds out to an extended overwidth position, laterally of the base track. This increases the width of the trailer for receiving a combine with overwidth wheels. The tracks are supported by tapered box beams that fold on each other to the storage position. A second extensible track has projecting beams that may be inserted into the tapered box beams for further extending the width of the trailer. The tongue of the trailer is attached to the frame from below to allow the grain truck to tip its bed for dumping.

BRIEF DESCRIPTION OF THE DRAWINGS

FIG. 1 is a perspective view of a trailer constructed in accordance with this invention, shown in its grain carrying mode.

FIG. 2 is an elevational view of the trailer of FIG. 1 shown in its combine hauling mode.

DESCRIPTION OF THE PREFERRED EMBODIMENT

Figure 3:
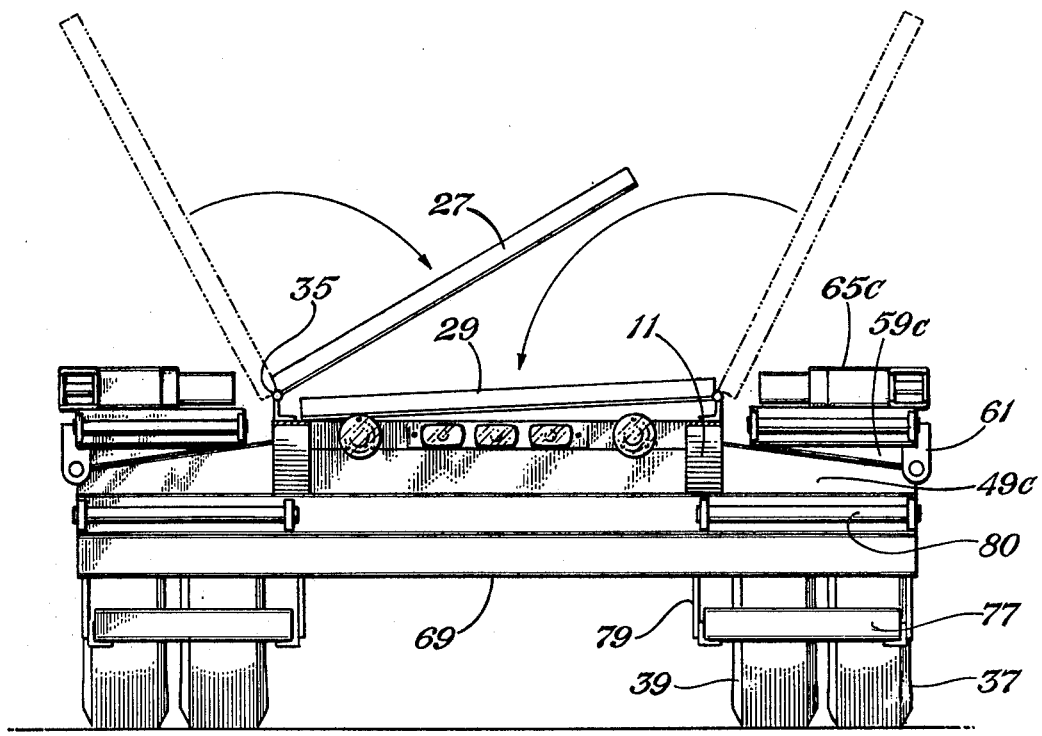
FIG. 3 is an enlarged elevational view from the rear of the trailer of FIG. 1, showing the side panels being folded to convert to its combine hauling mode.

Referring to FIG. 1, a grain truck A is shown towing a trailer B in its hopper or grain hauling position. In FIG. 2, the trailer B is shown converted to its combine hauling position, with a combine C loaded.

As shown in FIGS. 1 and 2, trailer B has a rectangular frame 11 of longitudinal and transverse I-beams mounted on a tandem set of dual wheels 13. A tongue 15, comprised of two converging I-beams, is welded to the lower surface of the frame 11. Near the point at which the beams of tongue 15 converge, the forward portion of the tongue, or leveling member 17, extends upward and forward a selected distance, terminating at approximately the height at which hitches are normally located on trucks. The hitch means 19 between truck A and tongue 15, is preferably ring and pintle. As shown in FIG. 2, dumping means for releasing stored grain in the trailer comprise three funnel shaped hoppers 21 attached below and between the frame 11. Trap doors 23 in the bottom of hoppers 21 may be drawn by levers 25, FIG. 1, to open the hoppers 21.

In the position of FIG. 1, side panels 27, 29, front panel 31, and rear panel 33 are erected to define a hopper for carrying grain. Referring to FIG. 3, the side panels are rectangular and connected by hinges 35 to the frame 11. Side panels 27, 29 will fold or rotate in the vertical plane with respect to the frame from a substantially flat position parallel to the plane of the frame, to the erected position, as shown by the dotted lines and arrows in FIG. 3. In the storage position, side panels 27, 29 rest on each other and on frame 11. In the erected position, the outside upper edges of the side panels 27, 29, are substantially in vertical alignment with the outer sides 37 of the wheels 13, approximately 94 inches apart. The lower edges of the side panels 27, 29, are substantially aligned vertically with the inner sides 39 of wheels 13, approximately 46 inches apart. This provides an angle of inclination for the side panels of approximately 120°, as rotated from the storage position.

Figure 7:
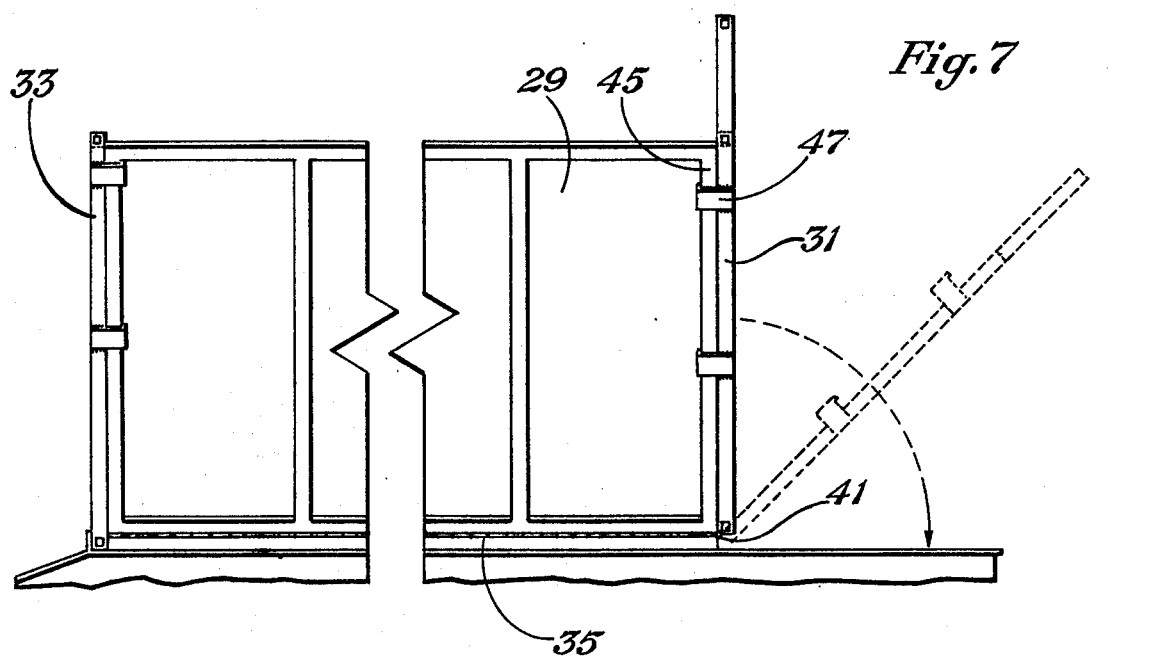
FIG. 7 is an enlarged side elevational view of the trailer of FIG. 1, showing the front panel being folded to its combine carrying mode.

The front panel 31 and rear panel 33 are trapezoidal in configuration, being approximately 94 inches across the top and 4 feet across the bottom. As shown in FIG. 7, front panel 31 is connected by hinge 41 to frame 11 and folds from a vertical position to a storage position that is substantially parallel with and resting on the frame 11. Front panel 31 folds outward from the hopper to the storage position, while side panels 27, 29 fold inward toward each other.

Figure 8:
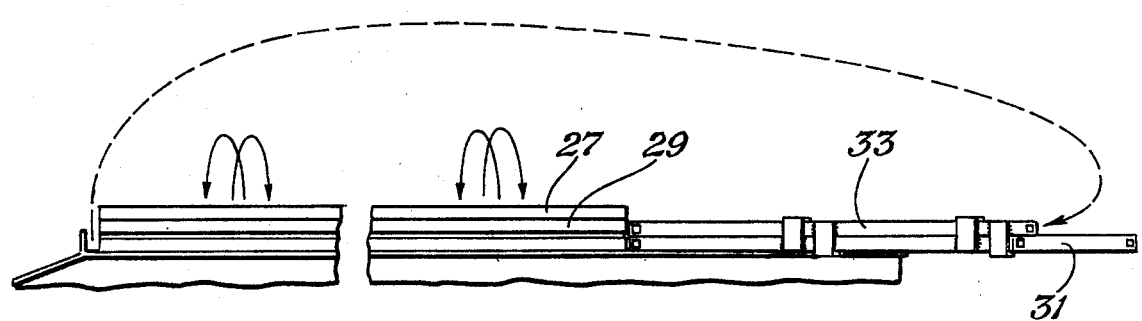
FIG. 8 is a view of FIG. 7, showing the trailer in combine carrying mode.

Rear panel 33 is carried by frame 11 through columns 43, FIG. 1, which project beyond the lower surface of panel 33 and slide into apertures (not shown) in frame 11. Rear panel 33 is moved from the erected or vertical position to the horizontal storage position by drawing it upward then sliding it onto the front panel, as shown in FIG. 8. In the storage position, the bed of the trailer is substantially flat so that a vehicle may be driven over it.

Figure 9:
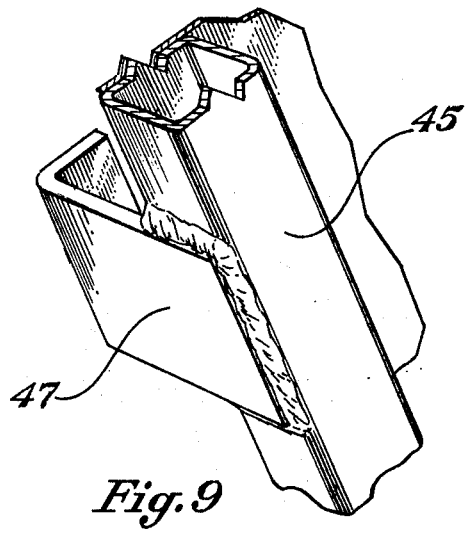
FIG. 9 is a fragmentary enlarged perspective view of the upper left corner of the rear panal of the trailer of FIG. 1.

As shown in FIG. 9, all of the panels are constructed of sheet metal with a square tubular frame 45. In the erected position, the front, side, and rear panels are held together through L-shaped brackets 47, attached to the sides of the front and rear panels 31, 33. The brackets 47 extend inward from the respective panels a distance sufficient to engage the tubular frame 45 of the side panels 27, 29, when erected.

Referring to FIGS. 1 and 3-6, a base track 49 is fixedly mounted to frame 11 along the length of each side. The width of base track 49 extends from frame 11, below hinge 35 to substantial vertical alignment with the outer side 37 of the wheels 13. The base track 49 is rectangular and planar with a plurality of transverse bars 51 connected across it. Transverse bars 51 create a surface upon which a vehicle with tires may roll. Base track 49 is made up of 3 separate frames on each side, as indicated in FIG. 2: a front section 49a, which extends from the front panel 31 to wheels 13; a mid-section 49b, which extends across the tandem wheels 13, and a rear section 49c, which extends from the wheels 13 to a selected distance behind rear panel 43.

Each section is supported by a pair of tapered box beams 53 (FIGS. 4-6) cantilevered from frame 11. The cross sectional area of each tapered beam 53 decreases in height as it extends outward from frame 11. The upper surface 55 of each tapered beam 53 is inclined at a negative angle with respect to the plane of frame 11, the lower surface 57 remaining parallel.

Figures 4, 5:
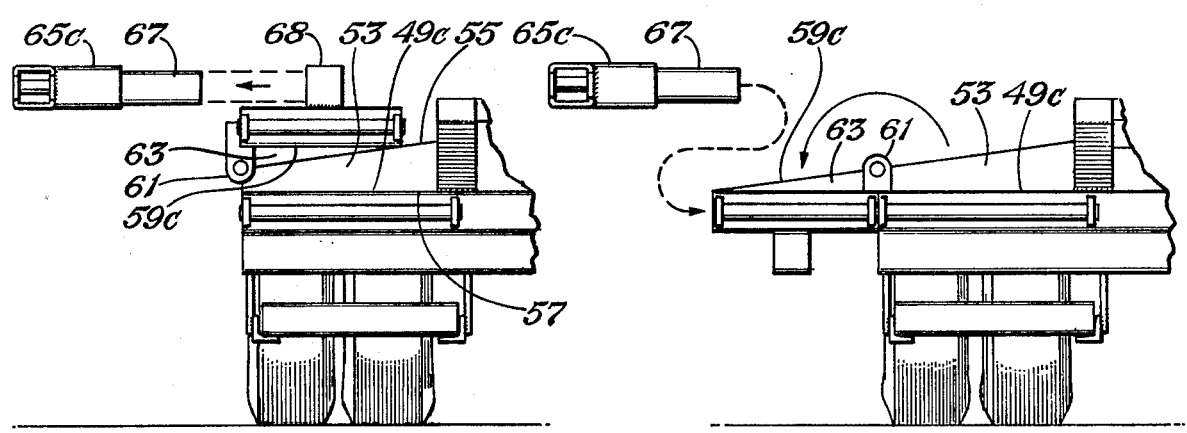
FIG. 4 is an enlarged fragmentary elevational view of FIG. 3, showing the first step for increasing the width of the trailer.
FIG. 5 is a view of FIG. 4, showing the second step for increasing the width.
Figure 6:
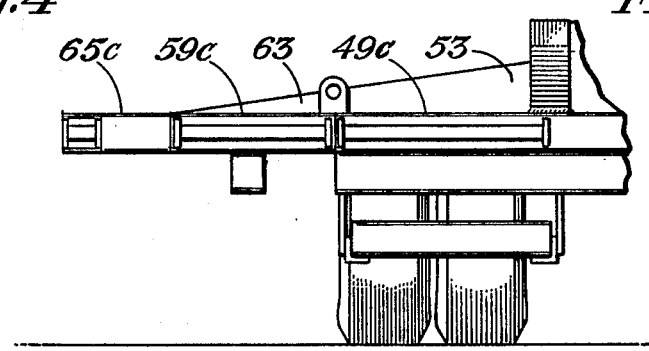
FIG. 6 is a view of FIG. 4, showing the trailer in extended position.

Extensible or hinged tracks 59a, b, c are foldably attached to each base track section 49a, b, c respectively. A hinge 61 is connected between each tapered beam 53 and a corresponding tapered box beam 63, which supports hinged track 59. Tapered beam 63 is aligned with tapered beam 53, its lower surface parallel to the lower surface 57, and its upper surface parallel with the inclined upper surface 55. As shown by the arrows 55, hinged track 59 may be rotated or folded in a vertical arc from the storage position as shown in FIG. 4 to the extended position as shown in FIGS. 5 and 6. In the storage position, the inclined upper surface of each tapered beam 63 contracts the inclined upper surface 55 of each tapered beam 53. In the extended position, hinged track 59 is disposed laterally outward from base track 49, increasing the width of the trailer. The increase in width in the preferred embodiment is approximately 22 inches on each side. In the storage position, the inner end at hinge 61 of the hinged track 59 extends approximately 1 inch further outward from the outer side 37 of wheels 13, making the distance across 8 feet.

Hinged track 59 is a sufficient extension to carry most combines. The largest combines, however, have an overall wheel width of approximately 12½ feet, thus require an additional extension. A second extensible track or track extension 65 is adapted to further increase the trailer width approximately 12 inches. Track extension 65 is comprised of a longitudinal beam with a pair of transverse box beams 67 projecting at right angles from it. Each box beam 67 is slightly less in cross sectional size than the interior cross sectional area of tapered beam 63, so that beam 67 may be inserted into tapered beam 63, as indicated in FIG. 5. Once fully inserted, track extension 65 is retained by pins (not shown). In the storage position, as shown in FIGS. 3 and 4, track extension 65 is carried in brackets 68 on top of hinged track 59. A track extension 65a, b, c is utilized with each hinged track 59a, b, c, respectively.

Figure 10:
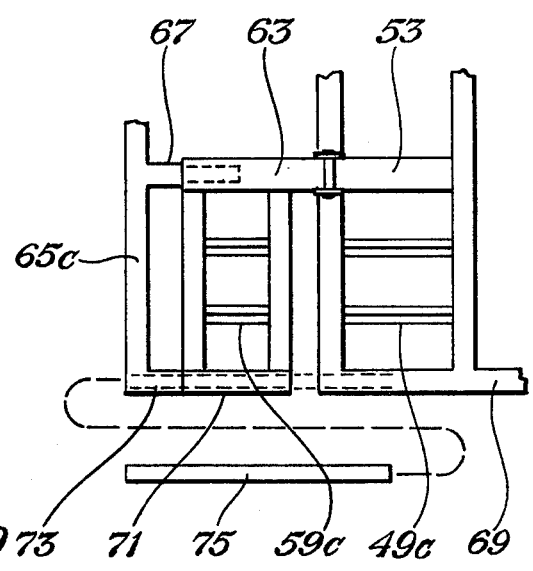
FIG. 10 is a fragmentary top elevational view of FIG. 6, showing the stiffener bar removed.

Referring to FIGS. 1 and 10, rear base track section 49c protrudes rearward from rear panel 33 at a selected distance. The farthest rearward of any tapered beams 53, 63 are aligned with the termination of frame 11 at rear panel 33. To provide support, the rear portion of base tracks 49c are connected to each other by a pair of box beams 69. Also each hinged track section 59c has a corresponding box beam 71, connected across its rear end and positioned so that it will align with beam 69. Similarly track extension 65c has a box beam 73 at its end that aligns with beams 71 and 69 when the tracks are in extended position. Referring to FIG. 10, a stiffener bar 75 of lesser cross-sectional area than the interiors of beams 69, 71, and 73, is inserted within the beams when extended, to strengthen the rear portion of the tracks.

Ramps 77 are carried below the rear base track section 49c in a carrier 79. Ramps 77 are used for loading the combine C and are suspended by bars 80, attached to the rearward side of beams 69, 71, and 73, during loading and unloading operations.

Combine C is hauled facing forward, its large front wheels 89 supported by the front sections 49a, and its smaller rear wheels 91 supported by the rear sections 49c. The rear wheels 91 may be narrower in overall wheel width than the front wheels 89, thus they may actually be in contact with base track 49c, while the front wheels 89 may be in contact with track extension 65a. The front, mid and rear sections 49a, 49b, and 49c and the corresponding extensible tracks are not positioned at the same elevation or height from the road surface. It is desired to keep the total load height to a minimum for clearance under bridges, thus the front and rear sections, 49a, 49c, are lower then the mid-section 49b, which is limited in height by wheel 13 height. The front section 49a is also lower than rear section 49c, since the front of the combine has the greatest height.

The trailer B is designed for towing behind a truck A of the type conventionally used in grain harvesting operations. Truck A has a box bed 81, with detachable side boards, and a hydraulic tilting mechanism 83 for dumping grain through a rear trap door 85. In this type of truck, normally the bed 81 extends beyond the rear of the truck frame a few feet. The angle of inclination of leveling member 17, and elevation of tongue 15 are selected to allow the box bed to fully tip without contacting tongue 17. In FIG. 1, the truck A is shown in a dumping position over grates 85, which receive the grain.

In operation, the trailer is converted from combine hauling position, as shown in FIG. 2, to hopper position as in FIG. 3, by initially placing the ramps 77 on bars 80, then driving the combine C off. The ramps 77 are then reloaded back into carriers 79, then the tracks are folded into storage position. First stiffener bar 75, FIG. 10, is withdrawn, then track extension 65 is removed. Hinged track 59 is folded over onto base track 49, as shown in FIG. 4. Track extension 65 is then inserted into retaining brackets 68, for storing. The operations are performed for all three sections, front, mid, and rear. This reduces the trailer width to the legal width of 8 feet.

Then rear panel 33 is removed from its storage position on front panel 31 and inserted in vertical position into frame 11. Front panel 31 is rotated on its hinge 41 to vertical position. Then side panels 27, 29 are rotated on their hinges 35 until received within brackets 47. Consequently hinges 35, 41, columns 43, and brackets 47 serve as means to selectively interconnect the panels in a position defining a hopper, as shown in FIG. 1, and in a storage position to create a substantially flat bed, as shown in FIG. 2.

It should be apparent that an invention having significant advantages has been provided. The trailer is capable of hauling vehicles with overwidth wheel spacing, including the largest combine now known to be in existence. In addition, the trailer is quickly convertible to a hopper of legal width size for carrying a large quantity of grain.

The foregoing disclosure and the showings made in the drawing are merely illustrative of the principles of this invention and are not to be interpreted in a limiting sense.

I claim:

1. A dual purpose trailer for selectively hauling granular material in bulk and for hauling a vehicle, comprising:
   a rectangular frame mounted on wheels, and having a tongue and hitch means for being towed by a truck;
   front, side, and rear panels, carried by the trailer, and means for selectively interconnecting them in a position defining a hopper for hauling granular material in bulk, and in a storage position for storing the panels to create a substantially flat bed;
   dumping means carried at the bottom of the trailer for releasing granular material;
   a base track fixed to the frame and extending along each side, its outer edge substantially in vertical alignment with the outer side of the wheels; and
   an extensible track, carried by the base track, and means for selectively moving the extensible track between a storage position, wherein the trailer width is substantially equal to the distance between the outer edge of the wheels, to an extended position wherein the extensible track is disposed laterally outward from the base track, increasing the width of the trailer for hauling vehicles with wheels spaced apart wider than the wheels of the trailer.

2. A dual purpose trailer for selectively hauling grain in bulk and for hauling a combine, comprising:
   a rectangular frame mounted on wheels and having a tongue and hitch means for being towed by a truck;
   front and side panels mounted to the front and sides respectively of the frame by hinges, so as to be foldable from a storage position resting substantially flat on the frame to an erected position defining three sides of the hopper;
   a rear panel detachably mounted to the rear of the frame and interconnected with the front and side panels to define the fourth side of the hopper;
   dumping means carried along the bottom of the frame for releasing grain carried within the hopper;
   a base track fixedly mounted to and extending along the sides of the frame, the inner edge of the track substantially vertically aligned with the side panel hinges, and the outer edge of the track substantially aligned vertically with the outer side of the wheels; and
   a first extensible track mounted by hinges to the outer edge of the base track so as to be foldable from a storage position resting substantially flat on the base track to an extended position located laterally of the outer edge of the base track, thereby increasing the width for receiving a combine with an overall wheel width greater than the overall wheel width of the trailer.

3. The apparatus according to claim 2 wherein the hinges between the base track and the first extensible track are located on transverse, tapered box beams, which support the tracks and which gradually reduce in height from the frame to the outer edge, with the lower surfaces of the tapered beams when extended remaining parallel with the plane of the frame.

4. The apparatus according to claim 3 wherein the base and first extensible tracks extend rearward a selected distance from the rear panel, and further comprising:
   a first transverse rear box beam extending across the rear of the base tracks, interconnecting them;
   a second transverse rear box beam extending across each first extensible track and positioned so as to be aligned with the first rear box beam of the base track when the extensible track is in the extended position; and
   a stiffener member, having a lesser cross-sectional area than the rear box beams; inserted slidingly within the rear box beams when the extensible track is in the extended position.

5. The apparatus according to claim 3 further comprising a second extensible track having transverse protruding members spaced and of a size for sliding reception within the tapered box beams of the first extensible track for further increasing the width of the trailer.

6. The apparatus according to claim 2 wherein in the hopper position, the lower edges of the side panels are spaced apart substantially equal to the distance between the inner sides of the wheels, and the upper edges of the side panels are spaced apart substantially equal to the distance between the outer sides of the wheels.

7. The apparatus according to claim 2 wherein the base track and the first extensible track are comprised of three sections on each side, one section extending from the wheels to the forward edge, another extending over the wheels, and a third extending from the wheels past the rear of the frame.

8. The apparatus according to claim 2 wherein the tongue comprises:
   a pair of beams attached below the frame and converging forwardly at a selected distance from the frame; and
   a leveling member extending generally upward and forward from substantially at the converging point to a height substantially level with a corresponding hitch on the truck; the angle of inclination of the leveling member being selected so as to allow the truck to tilt its bed for dumping grain without contacting the tongue.

9. The apparatus according to claim 2 wherein the front panel folds forwardly into the storage position, resting on the frame forward of the side panels, and the side panels fold toward each other into the storage position, one resting on the frame, and the other resting on the adjacent side panel.

10. A dual purpose trailer for selectively hauling grain in bulk and for hauling a combine, comprising:
    a rectangular frame mounted on wheels and having a tongue and hitch means for being towed by a truck;
    front, side, and rear panels, carried by the trailer, and means for selectively interconnecting them in a position defining a hopper for hauling granular material in bulk, and in a storage position for storing the panels to create a substantially flat bed;
    dumping means carried along the bottom of the frame for releasing grain carried within the hopper; and
    an extensible track hingedly carried by the frame along its sides so as to be foldable from a storage position wherein the trailer width is substantially equal to the distance between the outer edges of the wheels to an extended position located laterally of the outer edges of the wheels, thereby increasing the width for receiving a combine with an overall wheel width greater than the overall wheel width of the trailer.

11. A dual purpose trailer for selectively hauling granular material in bulk and for hauling a vehicle, comprising:
    a rectangular frame mounted on wheels, and having a tongue and hitch means for being towed by a truck;
    front, side, and rear panels, carried by the trailer, and means for selectively interconnecting them in a position defining a hopper for hauling granular material in bulk, and in a storage position for storing the panels to create a substantially flat bed;
    dumping means carried at the bottom of the trailer for releasing granular material;
    a base track fixed to the frame and extending along each side, its outer edge substantially in vertical alignment with the outer side of the wheels; and
    an extensible track, carried by the base track, and means for selectively moving the extensible track between a storage position, wherein the trailer width is substantially equal to the distance between the outer edges of the wheels, to an extended position wherein the extensible track is disposed laterally outward from the base track, increasing the width of the trailer for hauling vehicles with wheels spaced apart wider than the wheels of the trailer; the means for selectively moving the extensible track comprising:
    transverse beams on the base track and the extensible track aligned and connected by hinges located on the outside edge of the base track, thereby allowing the extensible track to rest on the base track in storage position, and to rotate in a vertical plane with respect to the trailer in the extended position.

12. A dual purpose trailer for selectively hauling granular material in bulk and for hauling a vehicle, comprising:
    a rectangular frame mounted on wheels, and having a tongue and hitch means for being towed by a truck;
    front, side, and rear panels, carried by the trailer, and means for selectively interconnecting them in a position defining a hopper for hauling granular material in bulk, and in storage position for storing the panels to create a substantially flat bed;
    dumping means carried at the bottom of the trailer for releasing granular material;
    a base track fixed to the frame and extending along each side, its outer edge substantially in vertical alignment with the outer side of the wheels; and
    an extensible track, carried by the base track, and means for selectively moving the extensible track between a storage position, wherein the trailer width is substantially equal to the distance between the outer edges of the wheels, to an extended position wherein the extensible track is disposed laterally outward from the base track, increasing the width of the trailer for hauling vehicles with wheels spaced apart wider than the wheels of the trailer;
    the means for selectively interconnecting the panels in a position defining a hopper and in a storage position for storing the panels comprising:
    hinges connected between the front panel and the frame and the side panels and the frame for folding the panels from a hopper position to a position substantially parallel with the plane of the trailer; and
    columns protruding from the lower edge of the rear panel received slidingly within apertures in the frame of the trailer, for detaching the rear panel.

13. A dual purpose trailer for selectively hauling granular material in bulk and for hauling a vehicle, comprising:
    a rectangular frame mounted on wheels, and having a tongue and hitch means for being towed by a truck;
    front, side, and rear panels, carried by the trailer, and means for selectively interconnecting them in a position defining a hopper for hauling granular material in bulk, and in a storage position for storing the panels to create a substantially flat bed;
    dumping means carried at the bottom of the trailer for releasing granular materials;
    an extensible track, carried along the sides of the trailer and means for selectively moving the extensible track between a storage position, wherein the outer edge of the track is substantially aligned with the outer edge of the wheels, to an extended position wherein the outer edge of the track is disposed laterally outward from the outer edge of the wheels, increasing the width of the trailer for hauling vehicles with widely spaced wheels.

* * * * *